United States Patent [19]

Graff

[11] 4,001,597
[45] Jan. 4, 1977

[54] ELECTRIC POWER GENERATING SYSTEM

[76] Inventor: Albert L. Graff, 32 Wilson St., Pittsburgh, Pa. 15223

[22] Filed: June 20, 1975

[21] Appl. No.: 588,804

[52] U.S. Cl. .................................. 290/53; 290/42; 417/330; 60/398; 60/716
[51] Int. Cl.² ......................................... F03B 13/12
[58] Field of Search .............. 290/42, 53; 417/330; 60/398, 716

[56] References Cited

UNITED STATES PATENTS

| | | | |
|---|---|---|---|
| 1,407,885 | 2/1922 | Olmsted | 417/330 |
| 1,796,618 | 3/1931 | Petersen | 417/330 |
| 2,278,818 | 4/1942 | Zoppa | 417/330 |
| 3,151,564 | 10/1964 | Rosenberg | 417/330 |
| 3,746,875 | 7/1973 | Donatelli | 290/42 |

*Primary Examiner*—Gerald P. Tolin
*Attorney, Agent, or Firm*—Brown, Murray, Flick & Peckham

[57] ABSTRACT

A plurality of base members are seated on an ocean bed adjacent the shore and they support at their shore ends normally expanded compression cylinders provided with fluid inlets and outlets controlled by check valves. The outlets are connected by conduits with the inlet of a turbine that is operatively connected with an electric generator. Rigid pressure plates are disposed above the base members and the cylinders thereon and are inclined downwardly from their shore ends to their opposite ends, where they are hinged to the off-shore ends of the base members. Waves passing over the pressure plates will force their upper ends down to compress the cylinders to force fluid through the conduits to the turbine, after which spring means will expand the cylinders and raise the pressure plates. The base members are located in such positions on the ocean bed that the pressure plates will be depressed in succession to provide substantially constant flow of fluid to the turbine. The turbine can be a water turbine alone, or there can be both a water turbine and an air turbine.

5 Claims, 6 Drawing Figures

ELECTRIC POWER GENERATING SYSTEM

In these times of shortage of fuel for operating electric generators, it is important to seek other ways of supplying the energy for operating them. One source of energy that is free and unlimited is that provided by the waves formed on large bodies of water such as lakes and oceans, all of which shall be referred to herein as oceans. Many ways have been suggested for harnessing the power of these waves, but the apparatus proposed has been complicated and unduly expensive and subject ot high maintenance costs.

It is among the objects of this invention to provide an electric power generating system which makes use of ocean wave power, which is relatively simple and compact, which is inexpensive compared with known systems, which is dependable in operation and which requires little maintenance.

The invention is illustrated in the accompanying drawings, in which

Figure 1:
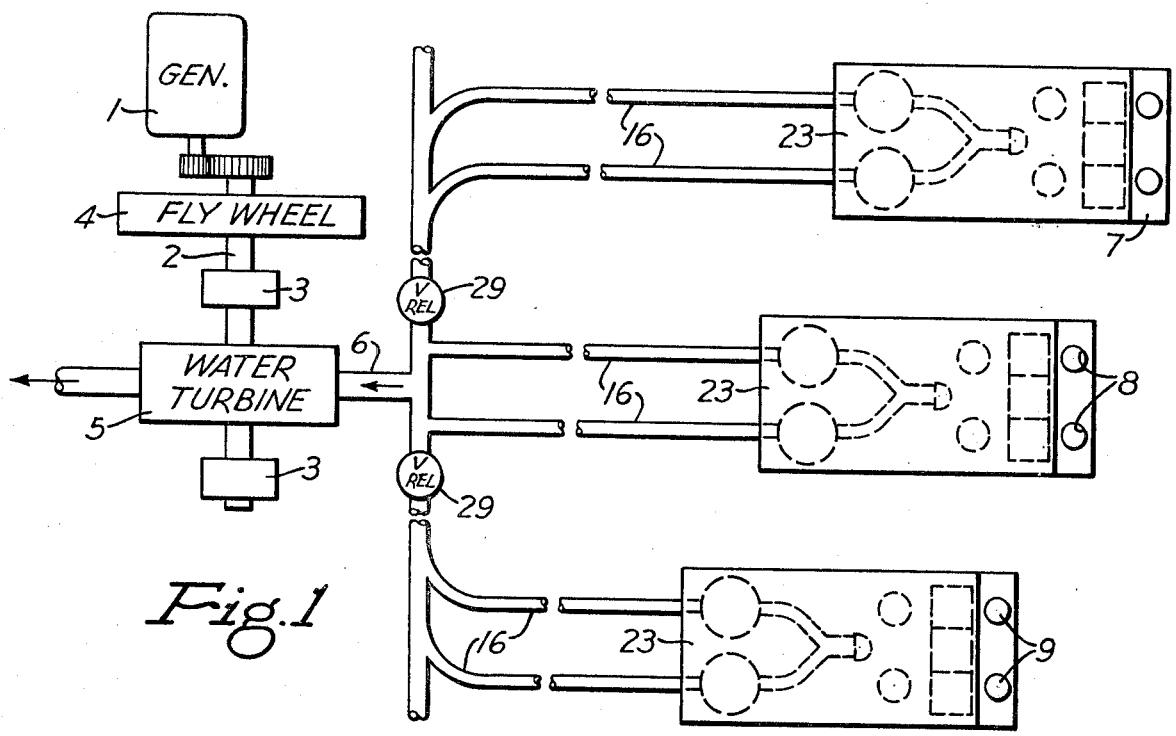
FIG. 1 is a fragmentary plan view of the system using only a water turbine.
Figure 2:
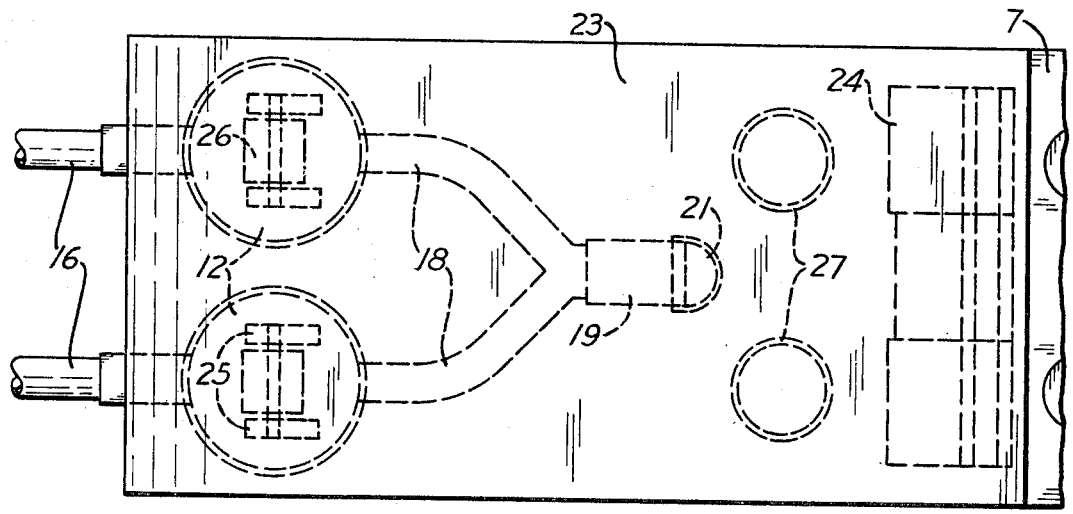
FIG. 2 is an enlarged plan view of one of the pumping units.

Referring to FIG. 1 of the drawings, at a suitable location along a coastline an electric power plant is located in which there is an electric generator 1, meaning a conventional generator or an alternator, that is driven by a shaft 2. The drive shaft is supported in suitable bearings 3 and supports a fly wheel 4. The shaft passes through a conventional water turbine 5 that is provided with an inlet for the stream of water that drives the turbine bucket wheel rigidly mounted on the shaft. This inlet is connected to a heavy pipe 6, to which water under pressure is supplied continuously from the nearby ocean by means of energy obtained from the ocean waves.

To harness the power of the waves and use that power to deliver water under high pressure to pipe 6, a plurality of pumping units are seated on the ocean bed adjacent the shore. Each of these units includes a base member 7, which may be a heavy rectangular plate of metal or concrete having a shore end closest to the shore and an off-shore end farther away. These base plates can be anchored in the desired positions by providing their offshore ends with openings 8, through which piles 9 can be driven into the ocean bed.

Figure 3:
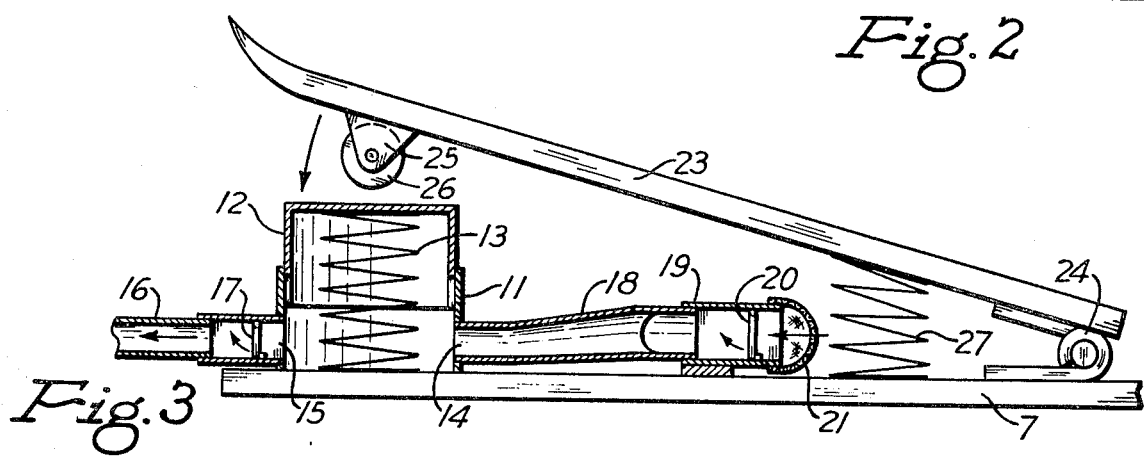
FIG. 3 is a side view, with one of the pump cylinders shown in vertical section.

Rigidly mounted on the shore end of each base plate is one or more upright compression cylinders. Although they can be any desired size, they should be several feet in diameter to pump the desired volume of water. As shown in FIG. 3, each cylinder may consist of a lower section 11 with an open upper end, and an upper vertically movable section 12 with an open lower end telescoped into the lower section. The cylinder normally is expanded, such as by means of a coil spring 13. Preferably, the spring is inside the cylinder and supports the upper section of the cylinder in its upper position. The lower section is provided with a water inlet 14 and with an outlet 15 that is connected by a heavy pipe 16 to the pipe 6 connected to the turbine. Outlet 15 is provided with a check valve 17 of any suitable type that allows water to flow out of, but not into, the cylinder. The cylinder inlet likewise is provided with a check valve, but it allows water to flow only into the cylinder. Since it is desirable to mount more than one cylinder on the base plate, two being shown in the drawings, the cylinder inlets are connected by branch pipes 18 to the outlet of a short inlet pipe 19, in which the inlet check valve 20 is disposed. The inlet of pipe 19 is covered by a screen 21 to keep out fish and other foreign objects.

In order to compress the cylinders so as to force water out of them and through the pipes to the turbine, a rigid pressure plate 23 is disposed above the base plate and the underlying cylinders. This plate is inclined from its shore end downwardly toward the offshore end of the base plate, to which it is pivotally connected on a horizontal axis by a suitable hinge 24. For best results, the upper end of the pressure plate is curved upwardly. Extending downwardly from the pressure plate directly above the cylinders are brackets 25, in which rollers 26 are journaled that engage or nearly engage the tops of the cylinders. Although the springs in the cylinders may be strong enough to raise the pressure plate to its upper position if the rollers always rest on the cylinders, it is preferred to mount coil springs 27 between the base plate and the pressure plate to remove most or all of the weight of the pressure plate from the cylinders.

The pumping unit just described is located on the ocean floor in a position where the curved upper end of the raised pressure plate 23 will be near the surface of the water or slightly above it. When a wave rolls in, it will press against this curved end and the rest of the pressure plate and, therefore, will force the upper end of the plate downwardly to cause rollers 26 to force the upper sections of the cylinders down into the lower sections. As the pressure plate moves downwardly, the rollers will roll on the cylinders a short distance. While the cylinders are being compressed in this manner, they will force water, with which they are filled, into their outlet pipes 16 for delivery to the turbine. As soon as a wave has passed over the pressure plate, the springs will expand the cylinders and raise the pressure plate to its upper position again ready to be depressed by the next wave.

In order to obtain a substantially constant flow of water to the turbine, a number of these pumping units, perhaps a dozen, are used and are located in positions where their pressure plates will be depressed in succession by incoming waves. That is, as soon as a wave has depressed one pressure plate the same wave or another wave will depress another pressure plate and this will continue along the line of units until the first pressure plate is depressed again by a following wave. The positioning of the different pumping units will depend upon the wave pattern. For example, if the waves roll straight into the shore, the units will be staggered or stepped, but if the waves come in at an inclination to the shore the pumping units can be arranged in a row substantially parallel to the shore line. Also, some of these units may operate only at high tide. That is, some of them can be located on the exposed ocean floor at low tide, but they will be operated by waves when the tide comes in and submerges them.

If, due to a storm, the waves become unusually high and, therefore, more forceful, there might be some danger of too much water pressure for the turbine. To avoid this, it is desirable to provide at least one of the pipes between the cylinders and the turbine with a pressure relief valve 29. If only one valve is used, it can be located in any of the pipes because all are in communication with all of the cylinders.

Another feature of this invention is that, if desired, normally expanded upright compression cylinders can be mounted on the base plates for forcing air through conduits to a high pressure air storage tank on shore. The inlets of such cylinders would be connected to inlet pipes that extend upwardly through openings in the pressure plate and above the highest level of the water. These pipes can be streamlined in cross section so that the waves will not knock them over. The air storage tank is provided with an outlet controlled by a throttle valve and connected by a pipe to the inlet of a compressed air turbine mounted on the drive shaft of the generator.

Figure 4:
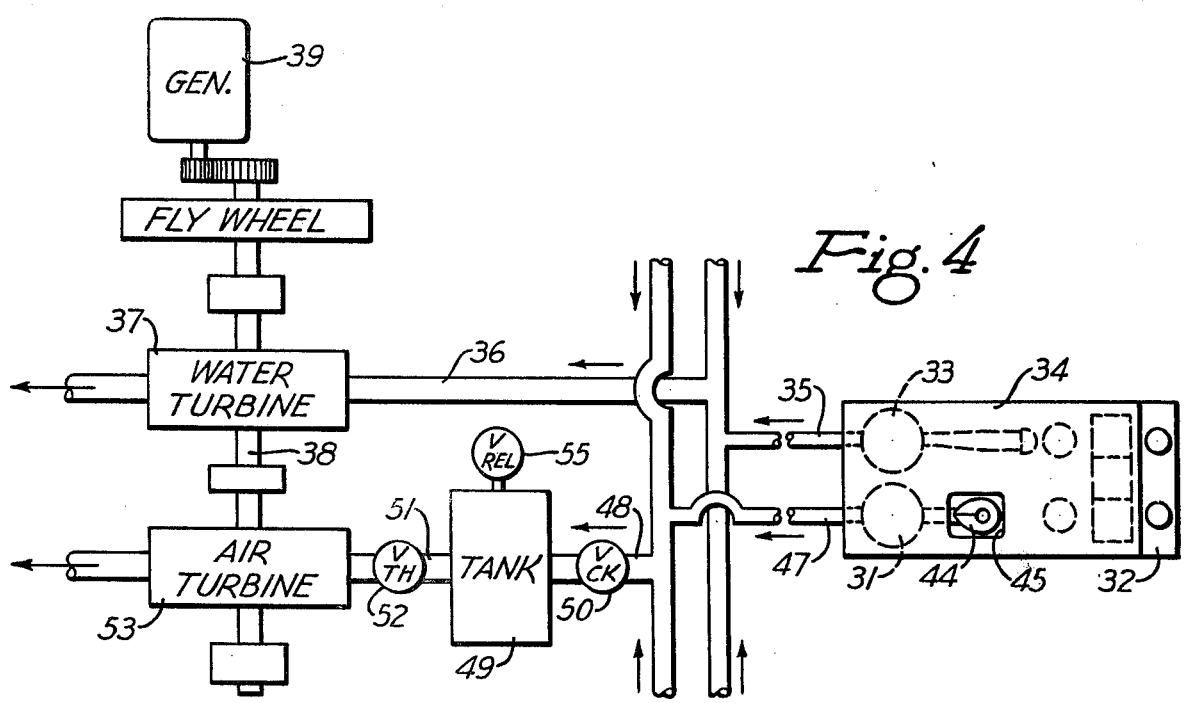
FIG. 4 is a view similar to FIG. 1 showing a modification in which an air turbine has been added.
Figure 5:
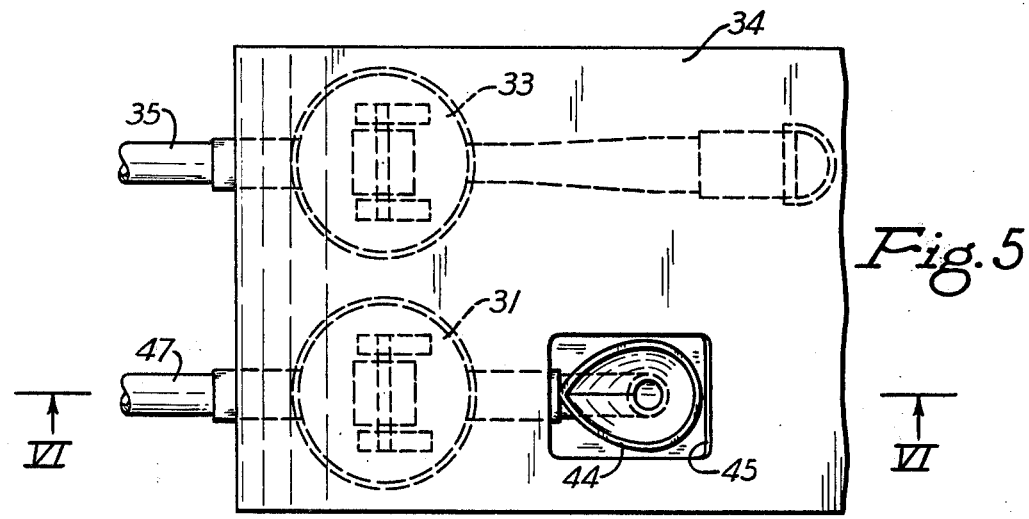
FIG. 5 is a fragmentary enlarged plan view of the pumping unit shown in FIG. 4.
Figure 6:
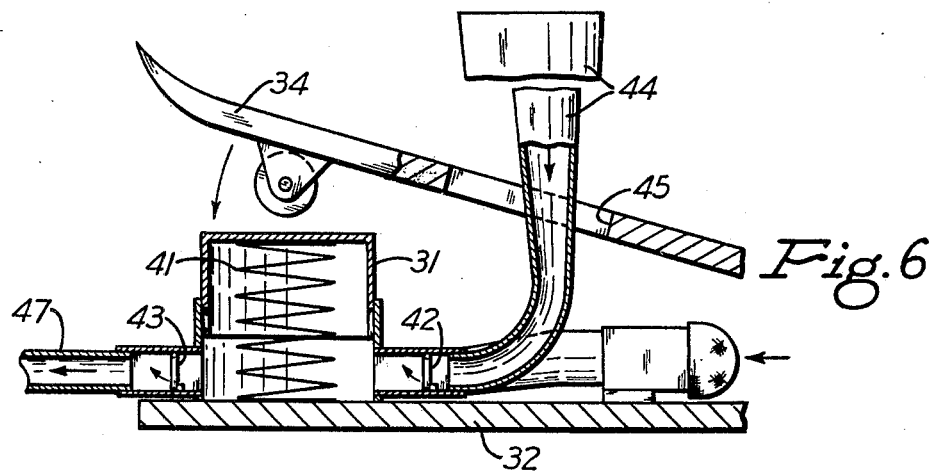
FIG. 6 is a vertical section taken on the line VI—VI of FIG. 5.

In the modification shown in FIGS. 4, 5 and 6 an air compression cylinder 31 has been substituted for one of the water pressure cylinders on each base plate 32, only one of which is shown. The water pressure cylinder 33 is like the one that has already been described. Every time a wave passes over the inclined pressure plate 34 that is hinged to the base plate, the pressure plate compresses the water cylinder 33 and forces water through conduits 35 and 36 to the inlet of a water turbine 37 mounted on a drive shaft 38 that operates a generator 39 or alternator.

The air cylinder 31 is constructed like the water cylinder. As shown in FIG. 6, it has a lower section in which an upper section is telescoped. The upper section is normally held in its upper position by a coil spring 41 inside the cylinder. The lower section has an inlet provided with a check valve 42 and an outlet likewise provided with a check valve 43. The inlet is connected to the lower end of a pipe 44 that extends upwardly to a height where its upper end will be above the highest expected waves. Although this pipe could extend up beside the pressure plate, it is shown extending through an opening 45 in that plate. The pipe can be braced in any suitable manner. Its vertical portion preferably is streamlined in cross section so that the waves will have less effect on it.

The outlet of the air cylinder is connected by conduits 47 and 48 to an air pressure tank 49 that preferably has a check valve 50 of any suitable construction at its inlet. The outlet of the tank is connected by a conduit 51 containing a throttle valve 52 to the inlet of an air turbine 53, the wheel of which is rigidly connected to the drive shaft 38.

When a wave passes over the pressure plate, the air cylinder is compressed to force a charge of air into the pressure tank, which can be provided with a relief valve 55 to limit the maximum pressure in the tank. Air under pressure from the tank flows at a regulated rate through the throttle valve to the air turbine to aid the water turbine in driving the shaft. Since there is continuous flow of air out of the tank, the air turbine helps to drive the shaft at a uniform speed even if the water delivered to the water turbine does not flow at a steady rate.

Depending upon the width of the base plates 32, each plate can support one or more water cylinders and one or more air cylinders. Also, if desired, some base plates may support only water cylinders while others support only air cylinders. The various pumps will be arranged to take full advantage of the waves as explained in connection with the first embodiment described herein.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An electric power generating system comprising an electric generator, a turbine operatively connected with the generator for driving it and having an inlet, a plurality of base members seated on an ocean bed adjacent the shore and having shore ends and off-shore ends, normally expanded upright compression cylinders mounted on the shore ends of said base members, each cylinder having a fluid inlet and an outlet, check valves for the cylinder inlets and outlets to direct flow of fluid through the cylinders in only one direction, conduits connecting the cylinder outlets with said turbine inlet, rigid pressure plates above said base members and the cylinders thereon and inclined downwardly from their shore ends to their opposite ends, means hinging the lower end of each pressure plate to the underlying base member on a horizontal axis, whereby waves passing over the pressure plates will force their upper ends down to compress the cylinders to force fluid through said conduits to said turbine, and means including a coil spring inside each cylinder for expanding it and raising the overlying pressure plate after each wave has passed over them, said base members being located in such positions on the ocean bed that said pressure plates will be depressed in succession to provide substantially constant flow of fluid to the turbine.

2. An electric power generating system according to claim 1, in which the shore end of each of said pressure plates is curved upwardly.

3. An electric power generating system according to claim 1, including a roller above each cylinder rotatable on a horizontal axis extending transversely of the adjacent pressure plate, and means secured to the bottom of the plates for supporting the rollers, whereby when the plates are depressed by waves the rollers will compress the cylinders.

4. An electric power generating system according to claim 1, in which each of said base members extends outwardly beyond said hinging means and is provided with an opening, there being a pile driven through said opening and into the ocean bed to stabilize the base member.

5. An electric power generating system according to claim 1, in which said turbine is a water turbine, and said cylinder inlets are water inlets, said system including an air turbine operatively connected with said generator to help drive it and having an air inlet, an air pressure tank having an inlet and an outlet, means including a throttle valve connecting the tank outlet with the air turbine inlet, normally expanded upright air cylinders mounted on at least some of said base members and having inlets and outlets provided with check valves, conduits connecting the air cylinder outlets with said tank inlet, and air inlet pipes connected to the air cylinder inlets and extending up above the surrounding water.

* * * * *